Sept. 15, 1942.  J. E. RINGROSE  2,296,119
WHEEL AND GEAR PULLER
Filed April 7, 1941  2 Sheets-Sheet 2
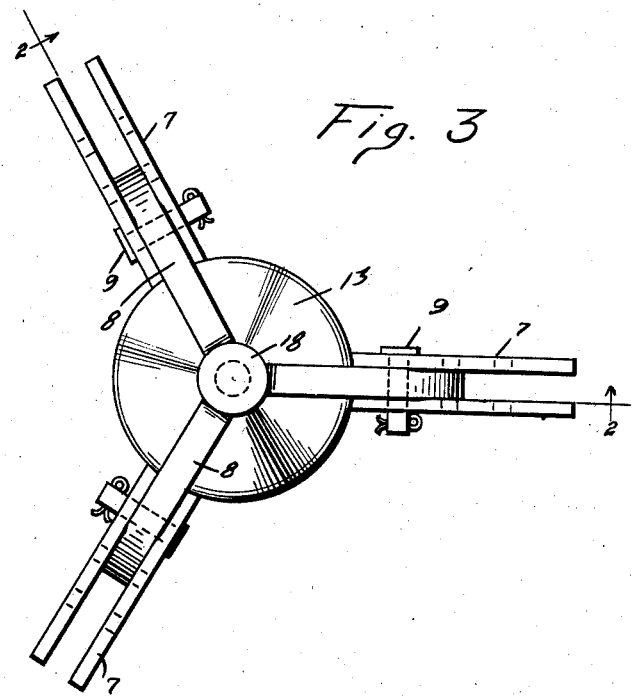
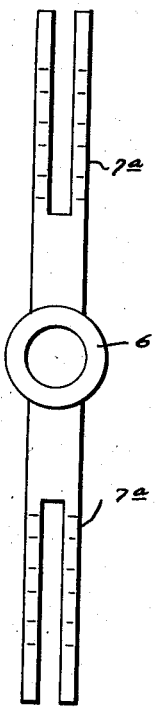
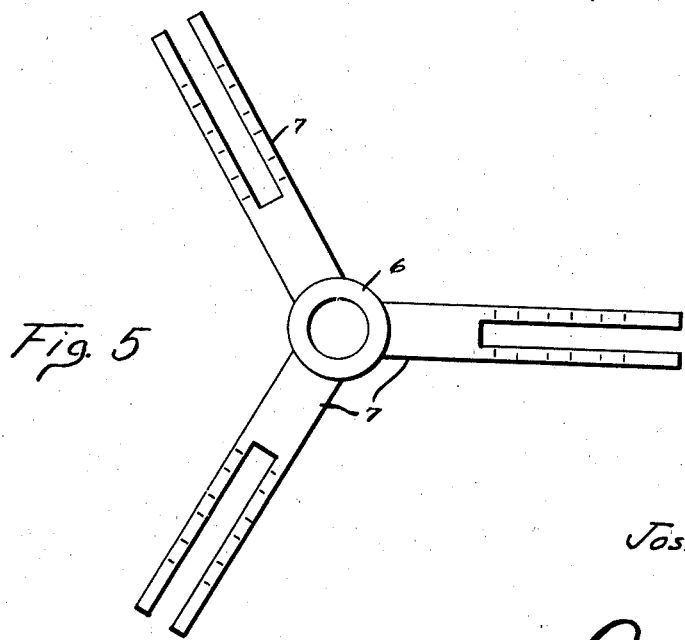
Inventor
JOSEPH E. RINGROSE
By Clarence A. O'Brien
Attorney Patented Sept. 15, 1942

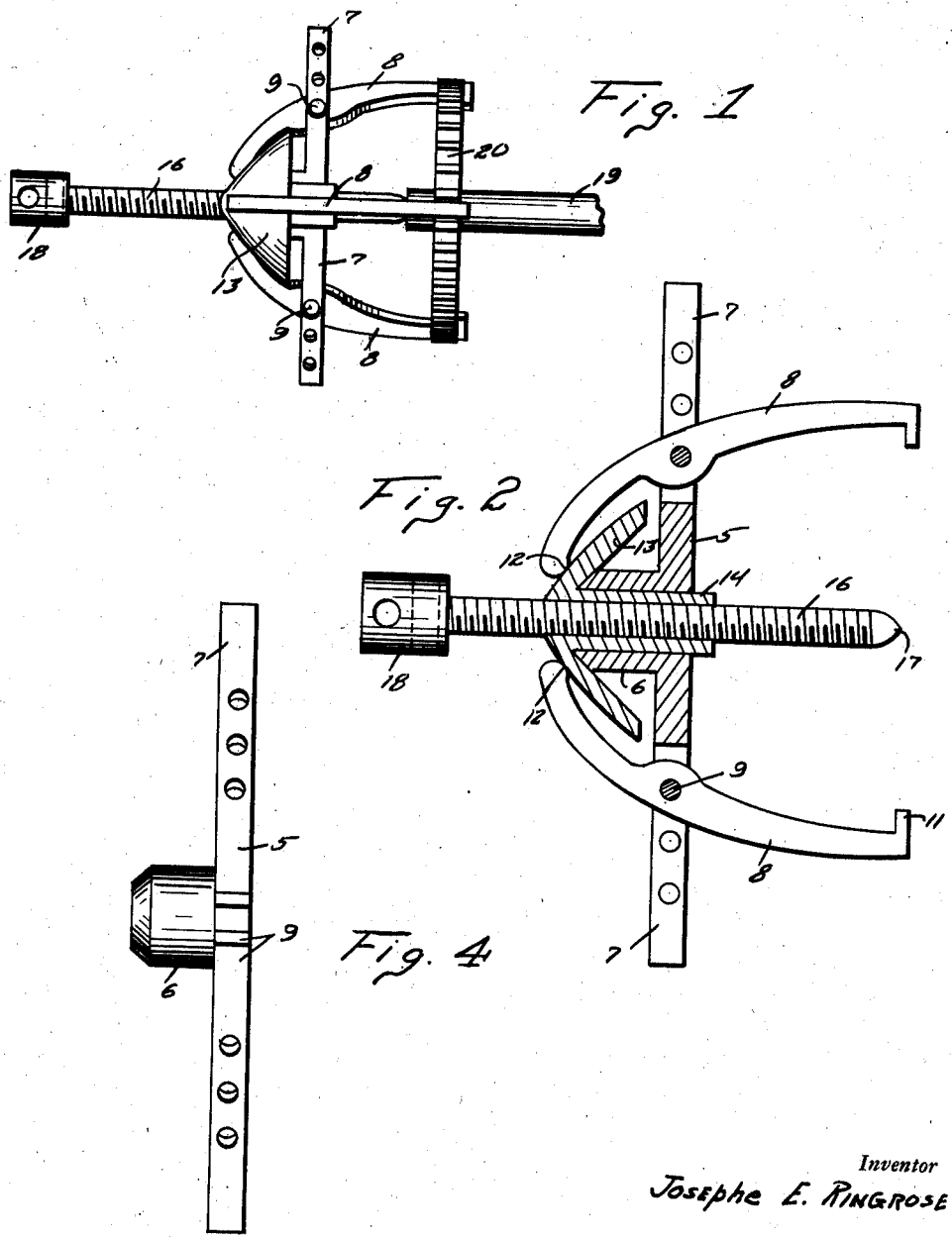

2,296,119

UNITED STATES PATENT OFFICE 2,296,119

WHEEL AND GEAR PULLER

Joseph E. Ringrose, Redmond, Oreg.

Application April 7, 1941, Serial No. 387,339

1 Claim. (Cl. 29—85)

This invention relates generally to pushing and pulling implements, and particularly to a tool for facilitating the removal of a gear, wheel, pulley, or analogous machine element from its supporting shaft or axle.

Generally an object of the invention is to improve upon such types of implements now used for the purposes stated.

Further in accordance with the present invention the tool is characterized by being so equipped as to insure more positive engagement of the tool with the work as the operation of removing the work from its shaft or axle progresses.

The invention, together with its objects and advantages, will be best understood from a study of the following description taken in connection with the accompanying drawings wherein—

Figure 1 is a side elevational view illustrating an application of the invention.

Figure 2 is an enlarged view partly in section and partly in elevation of the device.

Figure 3 is an end elevational view of the device.

Figure 4 is a side elevational view of a spider forming part of the invention.

Figure 5 is a plan view of a modified form of spider, and

Figure 6 is a plan view of a third form of spider.

Referring more in detail to the drawings it will be seen that in accordance with the present invention there is provided a spider, indicated generally by the reference numeral 5 and embodying an integral hub 6.

The spider 5 is characterized by having radiating therefrom bifurcated arms to the number desired. In the form of the invention shown in Figures 1 to 3, inclusive, and Figure 5, the spider is provided with three such bifurcated arms, indicated by the reference numerals 7, while in the form of the invention shown in Figure 6, the spider is provided with but two bifurcated arms, therein indicated by the reference numeral 7a. In this second form of the invention, the arms 7a extend from diametrically opposite sides of the hub as shown.

In connection with the above it will be understood that any desired number of bifurcated arms may be employed as found desirable.

Pivoted in the furcation of each arm is an intermediate portion of a curved gripping jaw 8. In this connection it will be noted that each bifurcated arm is provided with a series of opposed or registering openings therein, and each jaw 8 intermediate its ends is provided with an opening to align with a pair of opposed openings in an arm 7 whereby to accommodate a pivot pin 9. Thus a jaw 8 may be pivoted on an arm 7 at practically any position of adjustment lengthwise of the arm and relative to the hub 5 as found desirable.

At the work-engaging ends thereof the jaws 8 are provided with integral, angularly related gripping elements 11 while at the ends thereof remote from the gripping elements 11 the jaws 8 are provided with abutment teats 12 that engage and coact with a substantially conical cam 13.

The cam 13 is formed with an integral, internally threaded, cylindrical body 14 that seats within the bore of the hub 6, as shown, and complements and accommodates a screw 16.

At one end thereof the screw 16 is provided with a pilot point 17 to engage the shaft or axle from which the wheel, gear, or the like is to be removed, while at the opposite end thereof the screw is provided with an enlarged, transversely bored head 18 to receive a suitable tool to act as a handle for the screw 16 to facilitate rotation of the screw in the operation of the device.

In Figure 1 of the drawings, the tool is shown in the gripping position with the pilot end 17 disposed against an end of the supporting shaft 19 of a gear 20 that is to be removed from the shaft 19. It will thus be seen that by turning the screw 16 in the proper direction, the sleeve or body member 14 of cam 13 will have a tendency to shift axially of the screw to work on the ends 12 of the jaws 8 for forcing the elements 11 of the jaws into positive engagement with the gear 20. At the same time the screw 16 will force against the shaft 19 resulting in the gear 20 being drawn from said shaft. Thus it will be seen that with the tool in operation, the gripping engagement of the jaws 8 on the work 20 increases as the operation of removing the work from its supporting shaft or axle progresses. Thus the removal of the work from its supporting shaft or axle may be accomplished in a single efficient operation and with minimum effort within a comparatively short period of time.

It is believed that a complete understanding of the invention, together with an appreciation of its many advantages will be had without a further detailed description.

While I have herein illustrated and described the preferred embodiment of the invention, I wish it to be understood that I do not intend to limit the invention to the precise details of construction, combination and arrangement of parts herein illustrated and described, since modifications may be made therein by a person skilled in the art.

Having thus described the invention what is claimed as new is:

In a pulling tool, a spider embodying a hub and a plurality of arms radiating therefrom, said hub embodying a tubular part tapered at one extremity thereof, and each of said arms being bifurcated and provided at opposite sides of the bifurcation with a series of openings spaced longitudinally of the arm, elongated curved gripping members, there being one member for each arm, and each member provided intermediate its ends with an aperture for registry with selected opposed openings in the associated spider arm to receive a pivot pin for pivotally and adjustably connecting said member with an arm each arm having its ends axially extending from opposite sides of said hub and provided at one end with a cam surface, and at the other end with a gripping jaw, a cam embodying a tubular body having a working fit in the hub of said spider, and an integral substantially conical hollow head situated on that side of the hub that will position the same in operative engagement with the cam surfaces of said members, said conical hollow head receiving within the confines thereof and at the angle between said head and tubular body of the cam the tapered end of the tubular part of said spider hub, said tubular body of said cam having a threaded bore, an operating screw having a working fit within the bore of said tubular cam body and provided at one end with an enlarged head having a transverse tool accommodating opening.

JOSEPH E. RINGROSE.